(12) United States Patent
Gruman et al.

(10) Patent No.: US 9,172,625 B2
(45) Date of Patent: Oct. 27, 2015

(54) SYSTEMS AND METHODS OF COMMUNICATING PATH STATUS IN OPTICAL NETWORKS

(71) Applicant: FUJITSU NETWORK COMMUNICATIONS, INC., Richardson, TX (US)

(72) Inventors: Fredrick S. Gruman, Plano, TX (US); Catherine H. Yuan, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 300 days.

(21) Appl. No.: 13/768,787

(22) Filed: Feb. 15, 2013

(65) Prior Publication Data

US 2014/0233939 A1 Aug. 21, 2014

(51) Int. Cl.
| | |
|---|---|
| *H04B 10/032* | (2013.01) |
| *H04L 12/26* | (2006.01) |
| *H04Q 11/00* | (2006.01) |
| *H04L 12/28* | (2006.01) |
| *H04L 12/24* | (2006.01) |

(52) U.S. Cl.
CPC ........ *H04L 43/0811* (2013.01); *H04Q 11/0062* (2013.01); *H04B 10/032* (2013.01); *H04J 2203/0053* (2013.01); *H04J 2203/0057* (2013.01); *H04L 12/28* (2013.01); *H04L 41/0654* (2013.01); *H04Q 2011/0081* (2013.01); *H04Q 2011/0098* (2013.01)

(58) Field of Classification Search
CPC ..... H04L 12/26; H04L 12/28; H04L 41/0654; H04B 10/032

See application file for complete search history.

(56) References Cited

U.S. PATENT DOCUMENTS

| | | | |
|---|---|---|---|
| 2013/0007117 A1 | 1/2013 | Sivasubramanian et al. | |
| 2013/0064073 A1* | 3/2013 | Cheng et al. | 370/225 |
| 2013/0114953 A1* | 5/2013 | Moynihan et al. | 398/5 |
| 2013/0294228 A1* | 11/2013 | Ahuja et al. | 370/228 |
| 2014/0146663 A1* | 5/2014 | Rao et al. | 370/228 |
| 2014/0247712 A1* | 9/2014 | Cheung et al. | 370/228 |

OTHER PUBLICATIONS

Infinera, Cisco Systems, Verizon Communications, Automatic Protection Switching (APS) protocol for Shared Mesh Protection, ITU-T Study Group 15, Shenzhen, May 16-20, 2011, Document WD14.*

Huawei Technologies Co. Ltd; Infinera Corporation, Proposal of ODU Shared Mesh Protection, ITU-T Study Group 15, Nov. 2011, Contribution 1814.*

Infinera Corp, Encoding of ODU SMP messages, ITU-T Study Group 15, Xi'an, May 2012, Document WD67.*

(Continued)

*Primary Examiner* — Chi H Pham
*Assistant Examiner* — Shailendra Kumar
(74) *Attorney, Agent, or Firm* — Baker Botts L.L.P.

(57) ABSTRACT

The present disclosure may include a method to be performed by an electronic device in an optical network. The method may include generating a message associated with a slot and at least one connection identification (ID) corresponding to the slot. The message may include a slot counter region configured to identify the slot, a request region configured to activate a protect path utilizing the slot, a connection ID counter region configured to identify the at least one connection ID, and a status region configured to convey status of the at least one connection ID corresponding to the slot. The method may also include transmitting the message to other electronic devices in the optical network. The disclosure also includes associated systems and apparatuses.

36 Claims, 8 Drawing Sheets

(56) References Cited

OTHER PUBLICATIONS

Infinera, Cisco Systems, Verizon Communications; "Automatic Protection Switching (APS) protocol for Shared Mesh Protection"; Study Group 15; Working Party 3; Telecommunication Standardizing Sector ; pp. 21, May 9, 2011.

Huawei Technologies Co. Ltd; Infinera Corporation; "Proposal of ODU Shared Mesh Protection"; Study Group 15-Contribution 1814 Rev.1; Telecommunication Standardizing Sector; pp. 5, Nov. 22, 2011.

Infinera Corp.; "Encoding of ODU SMP messages"; Document No. WD67; Telecommunication Standardizing Sector ; pp. 8, Apr. 30, 2011.

Fujitsu Network Communications; "G.odusmp with TCM APS"; Study Group 15—Contribution 2044; Telecommunication Standardizing Sector; pp. 6, Aug. 24, 2012.

\* cited by examiner

SYSTEMS AND METHODS OF COMMUNICATING PATH STATUS IN OPTICAL NETWORKS

TECHNICAL FIELD

The present invention relates generally to the field of optical communication networks and, more particularly, to systems and methods of communicating path status in optical networks.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. In the past, optical networks have employed a ring topology in which each node on the network connects to two other nodes. However, increases in traffic have necessitated the utilization of mesh topology. Mesh topology allows many nodes to be connected to each other. Such a configuration allows for protection paths to function as a backup if there are problems with a working path functioning as the primary path of communication.

SUMMARY

In one embodiment, the present disclosure may include a method to be performed by an electronic device in an optical network. The method comprises generating a message associated with a slot and at least one connection identification (ID) corresponding to the slot. The message comprises a slot counter region configured to identify the slot, a request region configured to activate a protect path utilizing the slot, a connection ID counter region configured to identify the at least one connection ID, and a status region configured to convey status of the at least one connection ID corresponding to the slot. The method also includes transmitting the message to other electronic devices in the optical network.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

The present disclosure relates to the generation and transmission of messages to convey status of protection paths that are overprovisioned. By conveying the status of a protection path, a more informed decision may be made when a protection path is needed.

Figure 1:
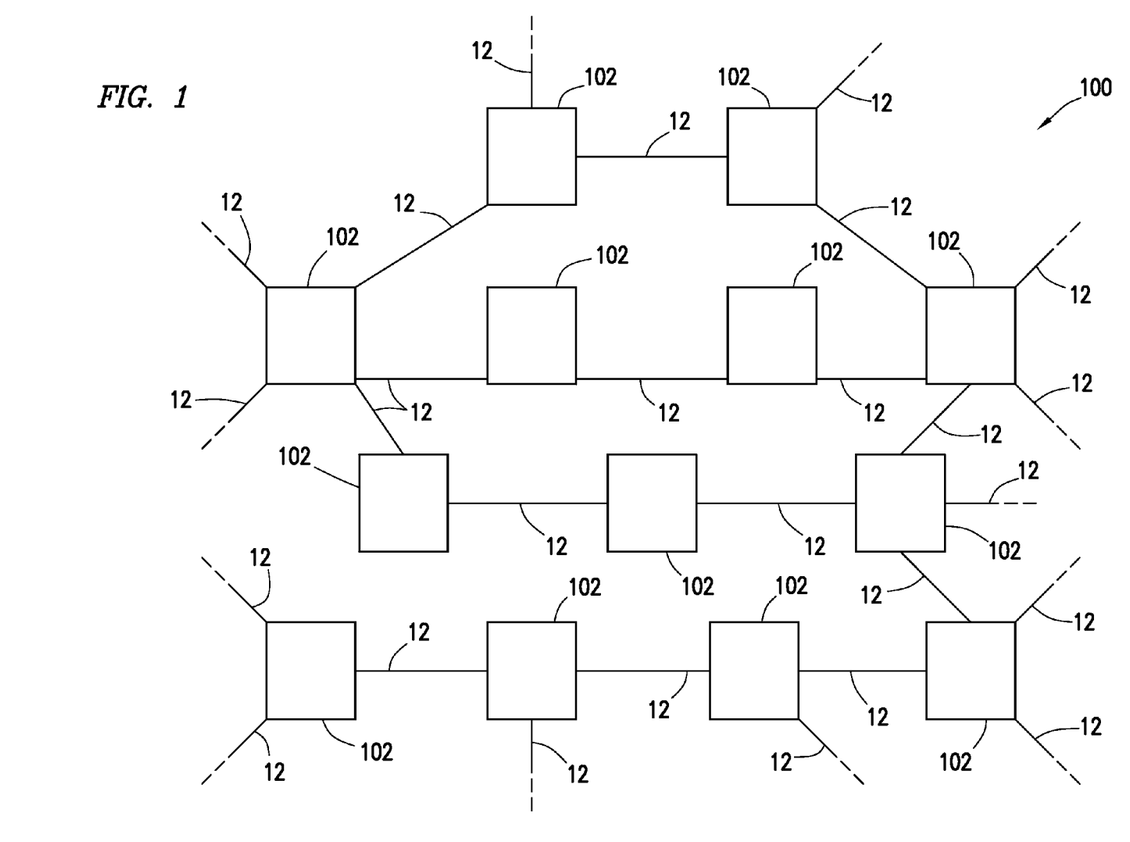
FIG. 1 illustrates an example embodiment of a network, according to some embodiments of the present disclosure.

FIG. 1 illustrates a block diagram of an example network 100, in accordance with one embodiment of the present disclosure. In certain embodiments, network 100 may be a shared mesh network. Network 100 may include one or more transmission media 12 operable to transport one or more signals communicated by components of network 100. The components of network 100, coupled together by transmission media 12, may include a plurality of network elements or nodes 102. In the illustrated network 100, each node 102 is coupled to one or more other nodes 102 to create a mesh. However, any suitable configuration of any suitable number of nodes 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks. Network 100 may represent all or a portion of a short-haul metropolitan network, a long-haul inter-city network, and/or any other suitable network or combination of networks.

Each transmission medium 12 may include any system, device, or apparatus configured to communicatively couple nodes 102 to each other and communicate information between corresponding nodes 102. For example, a transmission medium 12 may include an optical fiber, an Ethernet cable, a T1 cable, copper cable, a WiFi signal, a BLUETOOTH™ signal, or other suitable medium. In embodiments of the present disclosure, optical fibers may include thin strands of glass capable of communicating signals over long distances with very low loss. Optical fibers may include any suitable type of fiber, such as a Single-Mode Fiber (SMF), Enhanced Large Effective Area Fiber (ELEAF), or a True-Wave® Reduced Slope (TW-RS) fiber. Information may be transmitted and received through network 100 by modulation of one or more wavelengths of light to encode the information on the wavelength. In optical networking, a wavelength of light may also be referred to as a channel. Each channel may be configured to carry a certain amount of information through network 100.

Network 100 may communicate information or "traffic" over transmission media 12. Traffic may include information transmitted, stored, or sorted in network 100. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 100 may be structured in any appropriate manner including, but not limited to, being structured in frames, packets, or an unstructured bit stream.

Each node 102 in network 100 may include any suitable system operable to transmit and receive traffic. In the illustrated embodiment, each node 102 may be operable to transmit traffic directly to one or more other nodes 102 and receive traffic directly from the one or more other nodes 102. Nodes 102 may include any suitable arrangement of components operable to perform the operations of the node 102. As an example, node 102 may include logic such as hardware, software, other logic, and/or any other suitable combination of the preceding. Logic may include any suitable device operable to execute instructions and manipulate data to perform operations, for example, a processor, microprocessor, field-programmable gate array (FPGA), or application specific integrated circuit (ASIC). Node 102 may include an interface operable to receive input, send output, process the input and/or output, or any combination of the preceding. An interface may include ports, conversion software, or both. Node 102 may include memory, such as, logic operable to store and facilitate retrieval of information. Memory may include Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding, and/or any other suitable components.

In certain embodiments of the present disclosure, nodes 102 may be configured to transmit optical signals through network 100 in specific wavelengths or channels. Nodes 102 may include any system, apparatus or device configured to convert an electrical signal into an optical signal and transmit the optical signal. For example, nodes 102 may each comprise a laser and a modulator configured to receive electrical signals and modulate the information contained in the electrical signals onto a beam of light produced by the laser at a particular wavelength and transmit the beam carrying the signal throughout the network. Nodes 102 may include client cards, switches, such as, optical transport network (OTN) switches, line cards, one or more multiplexers, one or more amplifiers, one or more reconfigurable optical add/drop multiplexers, and/or one or more receivers.

Traffic may be transmitted by nodes 102 within an OTN according to various protocols such as ITU G.709. Network elements 102 may transmit traffic in data packets or frames known as Optical channel Transport Unit (OTU) frames. The OTU frames may include an Optical channel Data Unit (ODU) signal within the OTU. The ODU may have a particular signal structure based on bandwidth, for example, ODU0, ODU1, ODU2, ODU2e, ODU3, ODU4, ODU5, and ODUflex. These may be collectively referred to as ODUk. Some ODU signals may be high order ODUs (HO-ODU) and others may be low order ODUs (LO-ODUs). A HO-ODU may include more than one LO-ODU. For example, an ODU1 signal may carry two ODU0 signals, or one ODU2 signal may carry eight ODU0 signals or four ODU1 signals. Alternatively, an ODU2 signal may carry a combination such as two ODU0 signals and three ODU1 signals. Each single ODU0 signal may be referred to as a tributary slot (TS). For example, an ODU2 signal may include up to eight TSs. Within a wavelength there may be HO-ODUs that have TSs and each TS or a combination of TSs may be a channel to carry information.

Network 100 may include both a management or control plane as well as a transport plane. The management plane may be used generally for administration and other management of the network, while the transport plane may be used generally for transmission of data through the network. However, the transport plane may carry some administrative data and facilitate some network management, and the management plane may carry some data. The ODUk signals may be part of the transport plane, as opposed to the control plane or management plane.

Figure 2A:
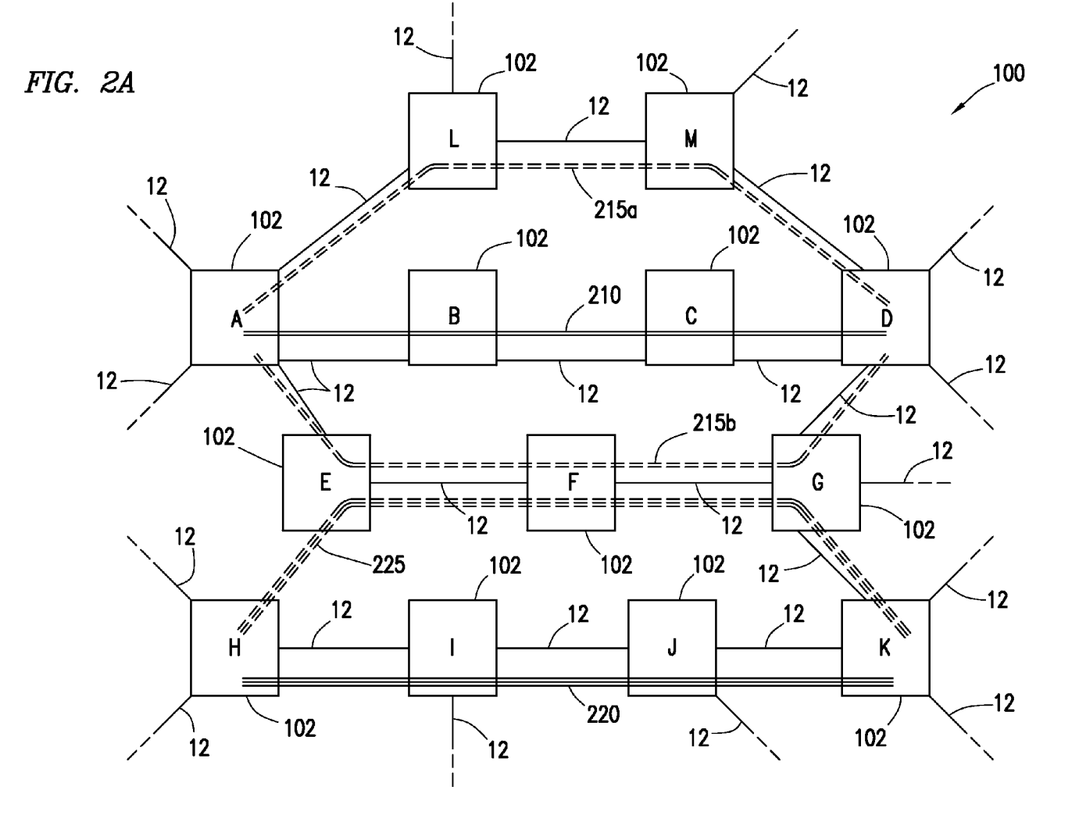
FIGS. 2A-2C illustrate example embodiments of a network utilizing protection paths, according to some embodiments of the present disclosure.

FIG. 2A illustrates an example of a network employing protection or backup paths. These paths may provide an alternative channel of communication in the event of disruption of a primary path of communication or working path. For example, a first communication may follow a first working path 210 from node A to node D via the path (A-B-C-D), represented by the two solid parallel lines. Node A, where the communication begins, may be referred to as a head node for working path 210, and node D, where the communication terminates, may be referred to as a tail node. A second communication may follow a second working path 220, flowing from node H to node K via the path (H-I-J-K), represented by the three solid parallel lines. Node H may be the head node and node K may be the tail node of working path 220.

As shown in FIG. 2A, working path 210 has two potential protection paths, protection path 215a and 215b, represented by the two dashed parallel lines. Protection path 215a flows from node A to node D via the path (A-L-M-D), while protection path 215b flows from node A to node D via the path (A-E-F-G-D). Working path 220 has one protection path 225, represented by the three parallel dashed lines. Protection path 225 flows from node H to node K via path (H-E-F-G-K).

As shown in FIG. 2A, some transmission media 12 and/or nodes 102 may be designated as a protection path for more than one working path, i.e. they may be overprovisioned. In some embodiments, this may only be employed if the working paths sharing the same protection path do not overlap in their working path, i.e. they are disjoint paths. When utilized in a shared mesh network, this may be referred to as shared mesh protection (SMP). Overprovisioning may refer to a resource that has multiple end-to-end working paths relying on it in the protect path. For example, if the transmission media shown in FIG. 2A were only capable of carrying one of the communications, the path (E-F-G) may be overprovisioned such that if one of the communications activated the protection path 215b or 225, the other would be excluded from using that protection path. In SMP, having disjoint working paths share a protection path may decrease the probability that a single error in a network disrupts working paths sharing the same protection path. This may in turn prevent them from simultaneously attempting to activate the same protection path.

Figure 2B:
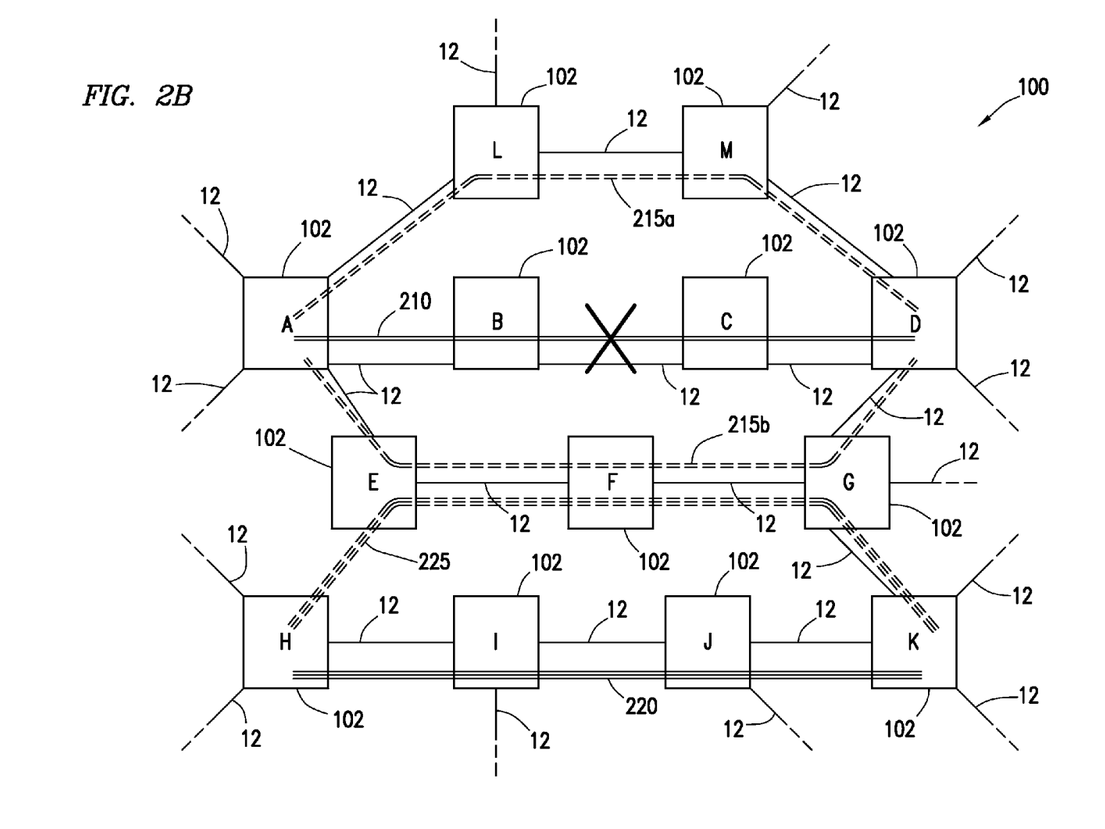
Figure 2C:
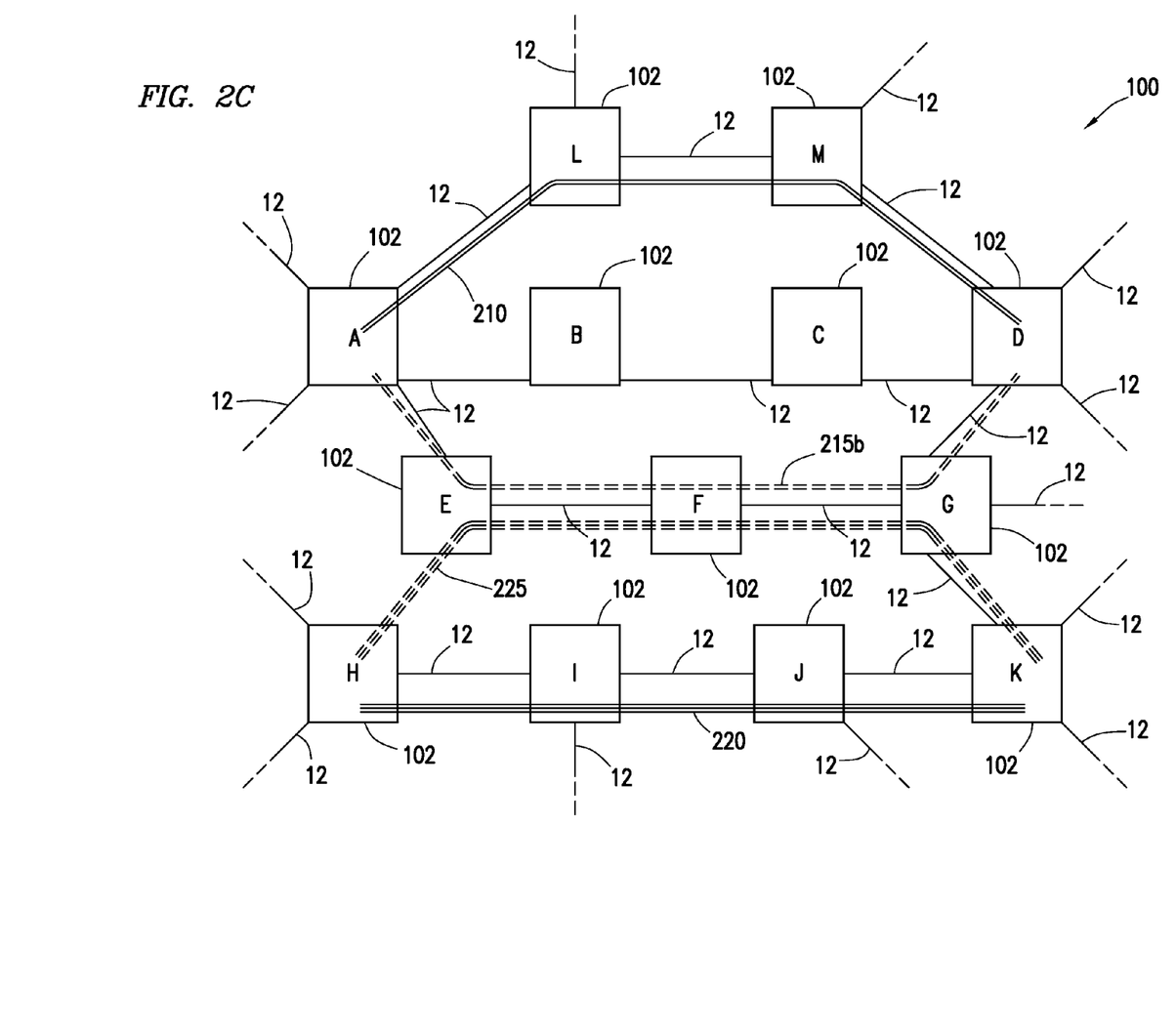

As shown in FIG. 2B, an error or problem may occur in the connection between nodes B and C. This may disrupt the data flowing along working path 210. The data flow may then transition to one of protection paths 215a or 215b. For example, as shown in FIG. 2C, working path 210 may now follow the path (A-L-M-D).

In some embodiments, the protection resource utilized in the protection path may be a TS within a HO-ODU on a given link. Each TS of a given link may be used for one of carrying primary or working traffic, carrying secondary or protected traffic, or be unassigned. The TSs may be configured by the management plane or control plane. A link may be the connection between two nodes within a network, and may include any hardware, software, logic, or combinations thereof at either of the two nodes and the transmission media connecting the two nodes. Each TS may be overprovisioned up to sixteen times, or in other words, may have an overprovisioning factor of sixteen. Each end-to-end protection path may be given a protection connection identifier (ID) at each TS. This protection connection ID may be consistent at each of the links in the path, or it may vary at each individual link.

To facilitate the overprovisioning, protection paths may be initially reserved or initially provisioned only in the management or control plane. Stated another way, these protection paths may only exist in memory and are not fully provisioned until needed. In this way, each working path may recognize its protection path or paths without actually fully provisioning the network resources.

When a failure occurs, a message may be sent to activate the protected path. For example, the head node may send a message downstream to activate the protected path and then wait for a message to come back upstream from the tail node indicating that the path has been fully provisioned and can begin carrying data. When multiple paths are present, a head node may randomly select a protected path to activate. If the protected path is not available, the head node may wait until a message comes back indicating that the path cannot be provisioned, increasing down time. For example, if a head node attempts to activate an overprovisioned protect path that has already been provisioned, that data path may experience an increase in down time as the head node must now find an alternative protect path.

In some embodiments, a message may be generated to convey the status of the protection resources, for example, the TSs, at a given link. The message may also be configured to convey the status of other links in the protection path. This may allow a head node to make an informed decision as to the availability of a particular protect path. This may also allow a head node to interrupt a fully provisioned path if higher priority data now needs a protected path. In some embodiments this message may include the four bytes of the automatic protection switching/protection communication channel (APS/PCC) portion of an ODUk message. The OTN standard may support eight different protection instances, each with their own APS, by using the OTN multiframe alignment signal (MFAS) counter. In some embodiments, the status messages are conveyed to the head-node of an end-to-end communication path such that the head-node may make a decision regarding which of a plurality of protection paths to select from.

Figure 3:
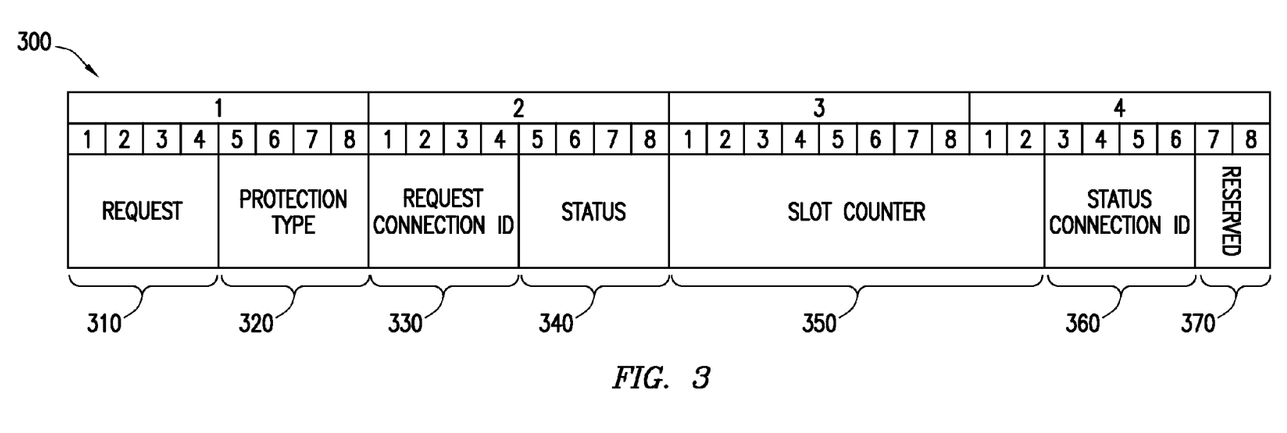
FIG. 3 illustrates an example of a message conveying status, according to some embodiments of the present disclosure.

FIG. 3 illustrates an example of a message 300 to convey status. Message 300 may be APS/PCC bytes of an ODUk message. Message 300 may include a request region 310, a protection type region 320, a request connection identification (ID) region 330, a status region 340, a slot counter region 350, a status connection ID region 360, and a reserved region 370.

Request region 310 may be configured to identify a message to activate a particular protection path. For example, if a working path failed, a head node may transmit an activation signal along the protection path, directing the protection path to be activated. This may cause the protected path to be fully provisioned. The request region may occupy four bits.

Protection type region 320 may be configured to convey the type of protection being utilized, and may utilize four bits. For example, protection type region 320 may indicate that SMP is to be used.

Request connection ID region 330 may be configured to identify which protection connection ID of a particular TS of the link is to respond to the request message. For example, if request region 310 contains a message indicating that the protection path should be activated, request connection ID region 330 may indicate which of the sixteen potential overprovisioned end-to-end protection paths for the given TS is to be activated. In this way, request region 310 and request connection ID region 330 may work together to activate a given protection path. Request connection ID region 330 may use four bits.

Status region 340 may be configured to convey the status of a given connection ID for a given TS. For example, status region 340 may convey that the TS is one of: good and available, good and path activated, in-use with a given priority (for example, priority zero through seven), failed resource, or not in use or misconfigured. This region may use four bits. For example, the following four bits may correspond to the following statuses: good and available (0000), good and path activated (0001), in-use with a given priority (for example, priority zero through seven) (0011-1001), failed resource (1010), or not in use or misconfigured (1111). A status of "good and available" may indicate that a particular resource of the protected path is properly configured, is working properly, and is available for use if a protected path is to be activated. A status of "good and path activated" may indicate that a particular resource of the protected path is properly configured, is working properly, but is in the process of being activated and fully provisioned. A status of "in-use" may indicate that the particular resource of the protected path has already been fully provisioned and is being used to carry data. The "in-use" message may include a priority of the data being carried, for example, the priority may range from zero to seven. A status of "failed resource" may indicate that the particular resource has had some type of error, failure, or problem such that the resource may not be utilized to communicate data. This status may allow a management system or user to be notified of the failure such that corrective action can be taken. This may facilitate preemptive correction of a backup path before the protection path is needed and found to be unavailable. A status of "not in use or misconfigured" may indicate that the particular resource has not been setup as a protection resource for the given communication path or connection ID. For example, if a given TS only had an oversubscription factor of four, the other twelve potential connection IDs may have a status of "not in use or misconfigured." Alternatively, a status of "not in use or misconfigured" may indicate that the particular resource was improperly setup as a protection resource such that it is unavailable.

Slot counter region 350 may be configured to identify which TS the message is about. For example, for ODU2, slot counter region 350 may only cycle through the eight TSs. However, for ODU4, slot counter region 350 may cycle through all eighty TSs. Slot counter region 350 may use ten bits.

In some embodiments, rather than cycling through all of the TSs (for example, one for ODU0, two for ODU1, eight for ODU2, thirty-two for ODU3, or eighty for ODU4), slot counter region 350 may only cycle through those TSs which have been initially provisioned as protection paths, rather than working paths or unassigned. In other words, if a given ODU4 only has forty TSs initially provisioned for protection paths, slot counter region 350 may only cycle through those forty TSs, rather than all eighty. This may involve more complexity in implementation, but may provide a quicker cycle time. In some embodiments, a message may be sent through the management or control channel to indicate which TSs have been designated for protection paths and should be cycled through.

Status connection ID region 360 may be configured to identify which connection ID of the current TS the status region 340 corresponds to. For example, if the status region 340 contains a message indicating a status of good and available, the message would indicate that the connection ID shown in status connection ID region 360 of TS shown in slot counter 350 is the connection being referred to as being good and available. This region may use four bits. This region may continuously cycle through all sixteen of the potential connection IDs for each of the sixteen overprovisioned protection paths. Status connection ID region 360 may also be referred to as a connection ID counter region.

In some embodiments, rather than cycling through all sixteen connection IDs, this region may only cycle through those connection IDs which have been initially provisioned. In other words, if a given TS only has four protection paths utilizing that TS, status connection ID region 360 may only cycle through those four connection IDs, rather than all sixteen. This may involve more complexity in implementation, but may provide a quicker cycle time for a TS with a lower overprovisioning factor. In some embodiments, a message may be sent through the management or control channel to indicate which connection IDs have been initially provisioned and should be cycled through.

Reserved region 370 may indicate bits that are unused or reserved for future use.

Using the regions designated above, message 300 may indicate status of a connection ID of a TS independently from the activation of protection paths. This may allow the cycle time of messages activating protection paths to be unchanged. For example, a request signal for any connection ID association with a TS may be sent every time TS counter region 350 reaches that TS. In such an embodiment, cycle times for a request signal may be as follows:

$$t_{cycle\ ODUk} = t_{frame} \times n_{MFAS} \times n_{max-TS}$$

$$t_{ODU1} = 48.971\ \mu s \times 8 \times 2 = 783.536\ \mu s$$

$$t_{ODU2} = 12.191\ \mu s \times 8 \times 8 = 780.224\ \mu s$$

$$t_{ODU3} = 3.035\ \mu s \times 8 \times 32 = 776.960\ \mu s$$

$$t_{ODU4} = 1.168\ \mu s \times 8 \times 80 = 747.520\ \mu s$$

where $t_{frame}$ indicates the time required per frame, $n_{MFAS}$ indicates the number of MFAS to arrive at this protection instance, and $n_{max-TS}$ indicates the maximum number of TSs for the given ODUk.

In contrast, the cycle time for a given status may be longer, because the status signal not only waits to cycle through each TS, but also cycles through the various connection IDs. For example, the cycle times for a status signal may be as follows:

$$t_{cycle\ ODUk} = t_{frame} \times n_{MFAS} \times n_{max-TS} \times n_{max-overprovision}$$

$$t_{ODU1} = 48.971\ \mu s \times 8 \times 2 \times 16 = 12.537\ ms$$

$$t_{ODU2} = 12.191\ \mu s \times 8 \times 8 \times 16 = 12.484\ ms$$

$$t_{ODU3} = 3.035\ \mu s \times 8 \times 32 \times 16 = 12.431\ ms$$

$$t_{ODU4} = 1.168\ \mu s \times 8 \times 80 \times 16 = 11.960\ ms$$

where $n_{max-overprovision}$ indicates the maximum overprovisioning factor that may be used, or in other words, the maximum number of connection IDs that a particular TS may be assigned. In this way, the status message may follow the cycling through the TSs occurring for the request messages, while cycling through the connection IDs for each of the TSs.

As described above, the cycle time may be shorter if slot counter region 350 were to only cycle through the TSs provisioned for protection paths, rather than all of the TSs. For example, if only four TSs were provisioned, the cycle times may be as follows:

$$t_{cycle\ ODUk} = t_{frame} \times n_{MFAS} \times n_{provisioned-TS} \times n_{max-overprovision}$$

$$t_{ODU1}\ (\text{unavailable to handle four TSs})$$

$$t_{ODU2} = 12.191\ \mu s \times 8 \times 4 \times 16 = 6.242\ ms$$

$$t_{ODU3} = 3.035\ \mu s \times 8 \times 4 \times 16 = 1.554\ ms$$

$$t_{ODU4} = 1.168\ \mu s \times 8 \times 4 \times 16 = 0.598\ ms$$

where $n_{provisioned-TS}$ indicates the number of TSs that are provisioned for protection paths.

As described above, the cycle time may be shorter if the status connection ID region 360 were to only cycle through the provisioned connection IDs, rather than all of the connection IDs. For example, if only four connection IDs were provisioned, the cycle times may be as follows:

$$t_{cycle\ ODUk} = t_{frame} \times n_{MFAS} \times n_{max-TS} \times n_{provisioned}$$

$$t_{ODU1} = 48.971\ \mu s \times 8 \times 2 \times 4 = 3.134\ ms$$

$$t_{ODU2} = 12.191\ \mu s \times 8 \times 8 \times 4 = 3.121\ ms$$

$$t_{ODU3} = 3.035\ \mu s \times 8 \times 32 \times 4 = 3.108\ ms$$

$$t_{ODU4} = 1.168\ \mu s \times 8 \times 80 \times 4 = 2.990\ ms$$

where $n_{provisioned}$ indicates the number of connection IDs that are provisioned.

In some embodiments, the above-two embodiments may be combined. For example, slot counter region 350 may only cycle through the TSs provisioned for protection paths and status connection ID region 360 may only cycle through those connection IDs initially provisioned. For example, if only four TSs were provisioned and only four connection IDs for each of those TSs were provisioned, the cycle times may be as follows:

$$t_{cycle\ ODUk} = t_{frame} \times n_{MFAS} \times n_{provisioned-TS} \times n_{provisioned}$$

$$t_{ODU1}\ (\text{unavailable to handle four TSs})$$

$$t_{ODU2} = 12.191\ \mu s \times 8 \times 4 \times 4 = 1.561\ ms$$

$$t_{ODU3} = 3.035\ \mu s \times 8 \times 4 \times 4 = 0.389\ ms$$

$$t_{ODU4} = 1.168\ \mu s \times 8 \times 4 \times 4 = 0.150\ ms$$

By providing status to a head node of a communication path, this may allow more precise activation of a protection path. For example, rather than randomly selecting a protected path only to find that the path is already in use or faulty, the head-node may already be aware of what protection paths are available and utilize a protection path known to be available. This may decrease down times when activating a protection path.

In some embodiments, a detailed status message, for example, that shown in FIG. 3, may allow a user or management system to be notified if one of the protection paths is damaged. This may allow corrective action to be taken. The detailed status message may also allow priority information to be utilized.

When using priority information of a communication path, higher priority data communication may interrupt lower priority information. For example, a rule may be in place indicating that a communication path only activates an in-use protection path if no unused protection paths are available. Another rule may be in place indicating that an in-use protection path is interrupted only if the priority of the in-use protection path is lower than the activating communication. An additional rule may be in place indicating that if multiple protection paths are in use, the lowest priority protection path would be interrupted. While example rules are provided, it will be appreciated that variations and modifications may be made to these rules and still achieve the desired result, namely, that higher priority communication has a communication path to use, even if it is at the expense of lower priority communication.

In some embodiments, a more simple status message may be sent. For example, the status may be binary, indicating the protection resource is available or not available. For example, a 0 may indicate available and a 1 may indicate not available, or vice versa. While this may not provide the same level of detail of status, this may allow cycle times to be shorter. A status of "available" may indicate that the protection resource is working properly and is not in use by another protection path also overprovisioning the same protection resource. In other words, "available" may indicate that the resource is available to be utilized to activate a protected path. A status of "not available" may indicate that the protection resource has had a failure, has been activated by another end-to-end path, has been misconfigured, or any other reason which may prevent an end-to-end communication from activating the protection resource to implement its protection path. In other words, "not available" may indicate that the resource is not available to be utilized to activate a protected path.

Figure 4:
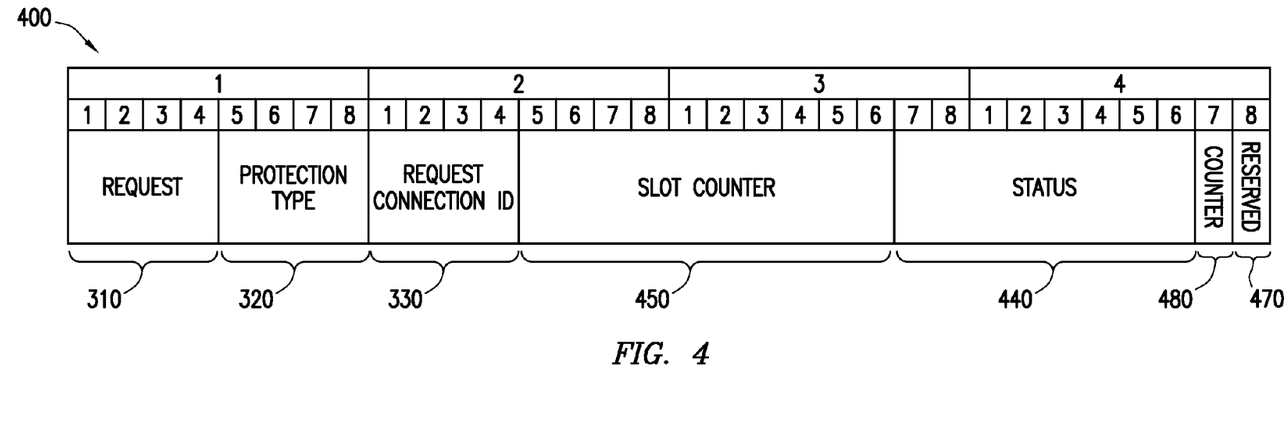
FIG. 4 illustrates an alternative example of a message conveying status, according to some embodiments of the present disclosure.

FIG. 4 illustrates an alternative example embodiment of a message 400. Message 400 may correspond to the four APS/PCC bytes of an ODUk message. Message 400 may include request region 310, protection type region 320, and request connection ID region 330 identical to those illustrated in FIG. 3. As shown in FIG. 4, slot counter region 450 may have its location changed. However, it may have ten bits and may perform the same function as slot counter region 350 of FIG. 3. Message 400 may also contain reserved section 470. While the section is smaller, these bits may be unused or reserved for future use just as reserved section 370 of FIG. 3. Message 400 may also include status region 440 and counter region 480.

Status region 440 may perform a similar function to status region 340. However, rather than utilizing four bits to convey status, only one bit is used to convey status. Status region 440 may use eight bits, each of the eight bits corresponding to eight different connection IDs. Counter region 480 may indicate whether status region 440 corresponds to the first eight or the second eight connection IDs of the sixteen total connection IDs. Counter region 480 may also be referred to as a connection ID counter region. Thus, in some embodiments, counter region 480 may be referred to as a status connection ID region, as it also may facilitate cycling through the connection IDs of a given TS.

Using the embodiment shown in FIG. 4, cycle times may be decreased as shown below:

$$t_{cycle\ ODUk} = t_{frame} \times n_{MFAS} \times n_{max-TS} \times n_{cycles-max-overprovision}$$

$t_{ODU1}$=48.971 μs×8×2×2=1.567 ms $t_{ODU2}$=12.191 μs×8×8×2=1.561 ms $t_{ODU3}$=3.035 μs×8×32×2=1.554 ms $t_{ODU4}$=1.168 μs×8×80×2=1.495 ms where $n_{cycles-max-overprovision}$ indicates the number of cycles to cover all of the connection IDs.

Figure 5:
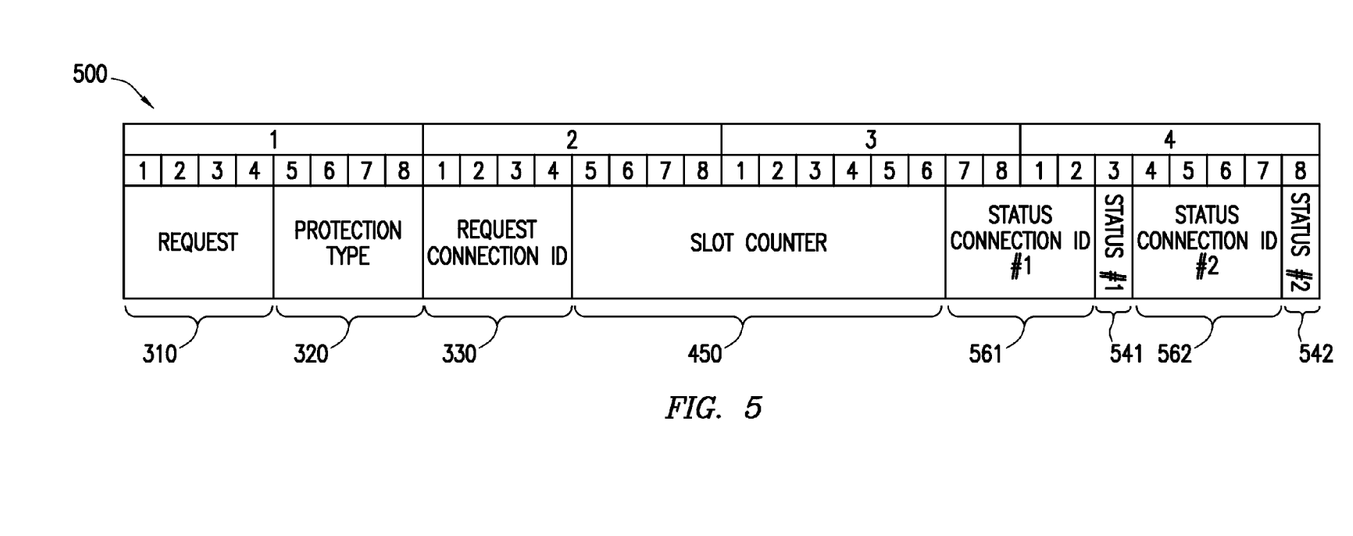
FIG. 5 illustrates an alternative example of a message conveying status, according to some embodiments of the present disclosure.

FIG. 5 illustrates another alternative example embodiment of a message 500. Message 500 may correspond to the four APS/PCC bytes of an ODUk message. As shown in FIG. 5, message 500 may include request region 310, protection type region 320, and request connection ID region 330 identical to those illustrated in FIG. 3. Message 500 may also include slot counter region 450 identical to that shown in FIG. 4. Message 500 may further include two status connection ID regions 561 and 562 with corresponding status regions 541 and 542 respectively.

Status connection ID regions 561 and 562 may use four bits and perform a similar function to that performed by status and connection ID region 360 of FIG. 3. However, rather than employing a four digit status region 340 as in FIG. 3, a single bit is used to provide a binary status in status regions 541 and 542. This may facilitate each cycle conveying status for two different connection IDs. Additionally, by using four bits to identify the connection ID, message 500 may only cycle through the provisioned connection IDs, rather than cycling through all of the connection IDs. This may provide an even shorter cycle time for systems with a low overprovisioning factor. However, as the overprovisioning factor increases, the cycle time for this embodiment may increase.

For example, cycle times for this embodiment using ODU4 may be as follows:

$$t_{cycle\ ODUk} = t_{frame} \times n_{MFAS} \times n_{max-TS} \times n_{provisioned}/2$$

$t_{ODU4}$=1.168 μs×8×80×1=747.520 μs (overprovisioning factor 1 or 2)

$t_{ODU4}$=1.168 μs×8×80×2=1.495 ms (overprovisioning factor 3 or 4)

. . .

$t_{ODU4}$=1.168 μs×8×80×8=5.980 ms (overprovisioning factor 15 or 16)

where $n_{provisioned/2}$ indicates the number of cycles required to cycle through all of the provisioned connection IDs when taken two per cycle. As can be seen, when the overprovisioning factor becomes large, this embodiment may have a longer cycle time compared to the embodiment shown in FIG. 4, while both embodiments convey the same binary status.

While FIGS. 3-5 may refer to particular regions of messages 300, 400, and 500, it will be appreciated that these regions represent logical designations, and may be combined or separated. For example, a given status region may be separated into multiple status regions, or multiple status regions may be referred to as a status region. In like manner, a status connection ID region may be separated into multiple connection ID counter regions, or multiple connection ID regions may be combined into a single connection ID counter region.

While the more detailed status may allow a more robust decision making process, as described herein, this may come at a cost of increased cycle times. Thus, there may be a trade off between frequency of status updates and the level of detail of information regarding the status.

In some embodiments, the status messages may flow in both directions. For example, with reference to FIG. 2A, a status message at node F may flow to both nodes E and G. Stated another way, the status message may flow in both ingress and egress directions. In some embodiments, these messages may be continuously sent, or may be always on. In some embodiments, these messages may combine local status as well as status received upstream and downstream. For example, with reference to FIG. 2A, a status message at node F may combine status information received from nodes G and E. The highest status may take precedent. For example, In some embodiments, the message may be used to modify or update statuses in an SMP provisioning table.

Figure 6:
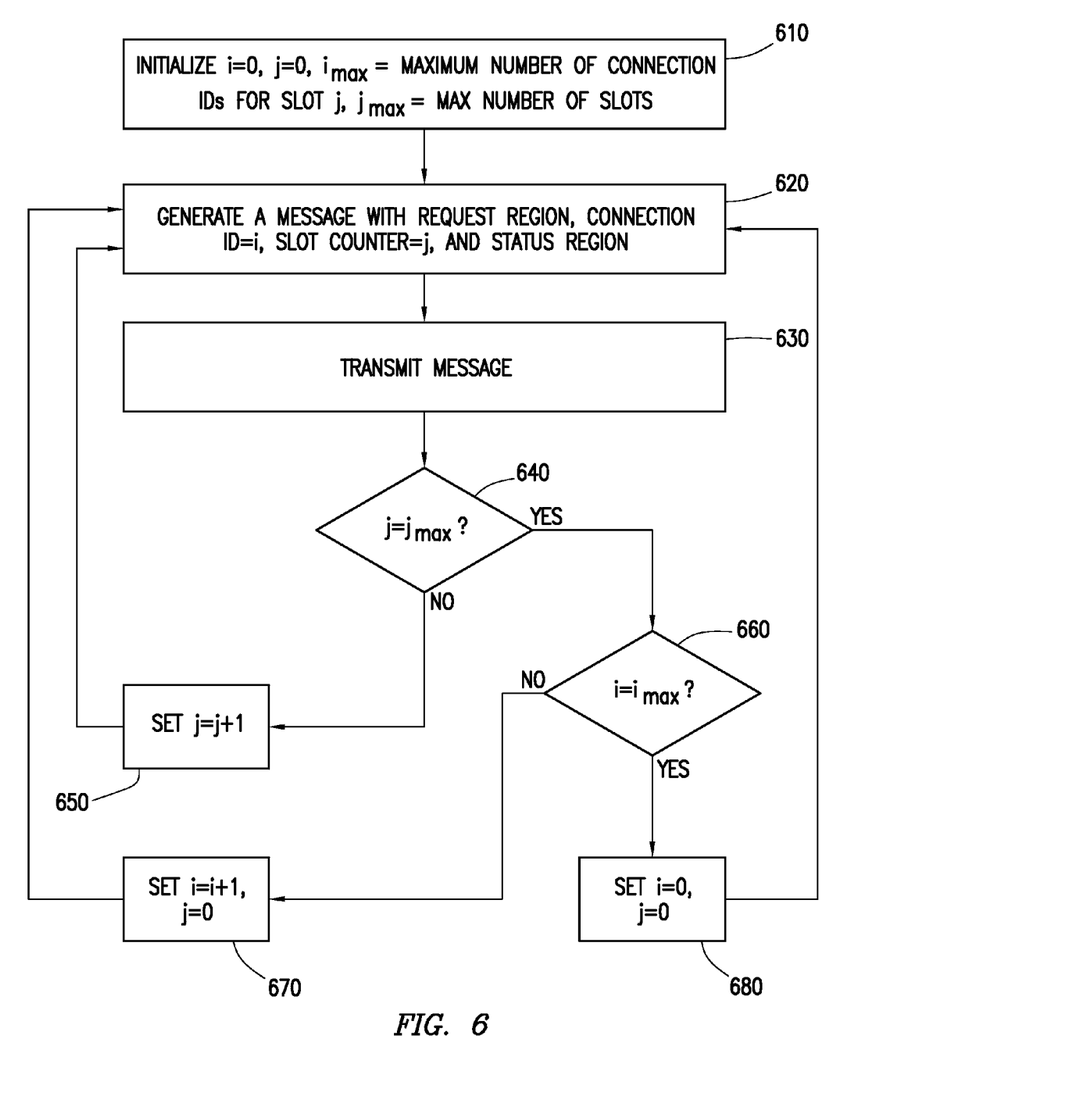
FIG. 6 illustrates an example set of operations, according to some embodiments of the present disclosure.
Figure 7:
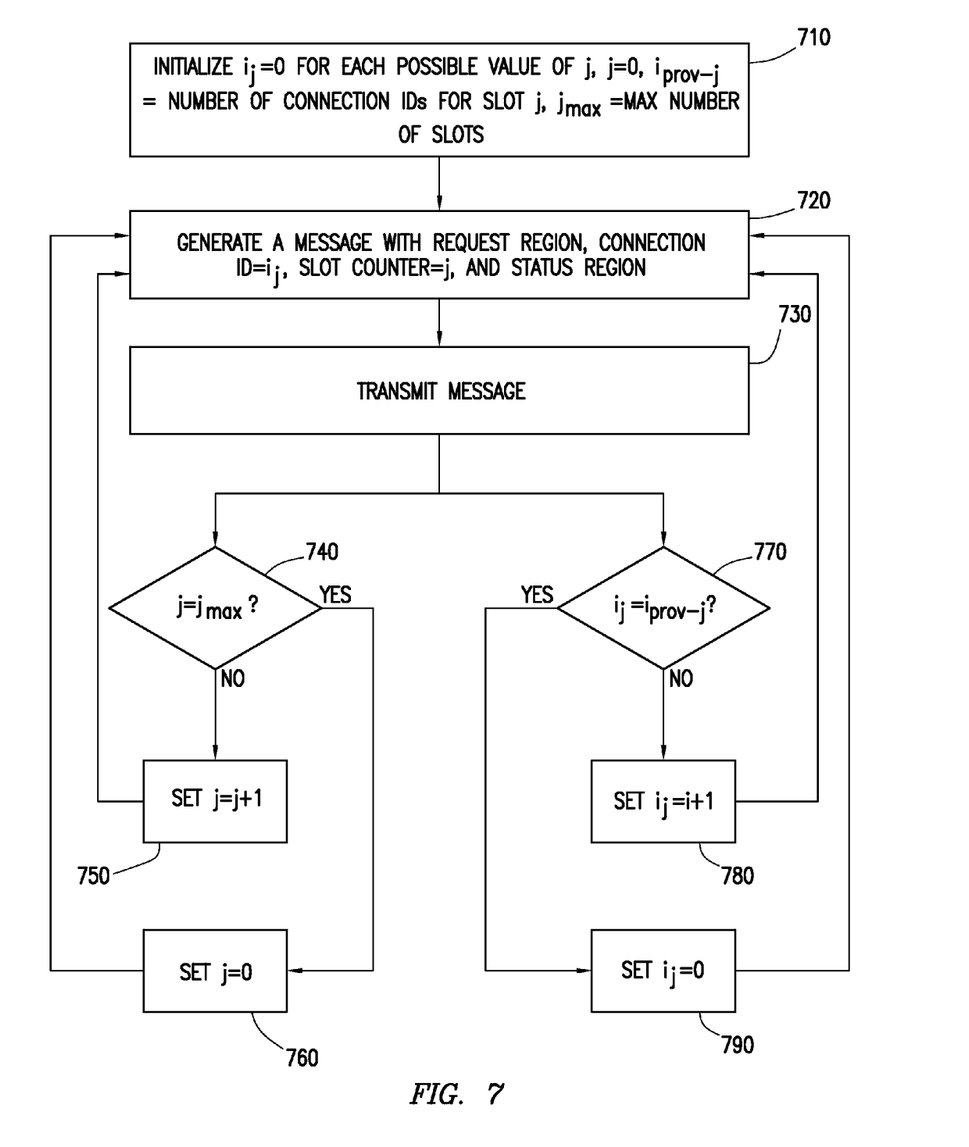
FIG. 7 illustrates an alternative example set of operations, according to some embodiments of the present disclosure.

FIGS. 6 and 7 illustrate example sets of operations in accordance with some embodiments of the present disclosure. For example, FIGS. 6 and 7 may be example operations which may be performed in accordance with embodiment shown in FIG. 3. It will be appreciated that modifications to the operations shown in FIGS. 6 and 7 may be undertaken to conform those operations to the embodiments shown in FIGS. 4 and 5.

With reference to FIG. 6, operation 610 includes initializing the variables i and j to zero, where i is the connection ID of slot j, and setting $i_{max}$ as the maximum number of connection IDs for a give slot j and $j_{max}$ as the maximum number of slots. In some embodiments, $i_{max}$ may be sixteen, representing the maximum possible overprovisioning factor. In some embodiments, $j_{max}$ may be based on ODUk, for example $j_{max}$ may be one for ODU0, two for ODU1, eight for ODU2, thirty-two for ODU3, and eighty for ODU4.

Operation 620 may include generating a message with a request region, a connection ID region with connection ID i, slot counter region with slot counter j, and status region conveying the status of connection ID i of slot j. Operation 630 may include transmitting that message.

Operation 640 may inquire whether slot j is equal to $j_{max}$, indicating that a message has been generated for each of the slots. If j does not equal $j_{max}$, operation 650 includes increasing j by one and then returning to operation 620 to generate another message based on the new value of j. If j does equal $j_{max}$, an inquiry is made at operation 660 as to whether a message has been generated for each of the connection IDs, or in other words, whether i is equal to $i_{max}$. If a message has not been generated for each of the connection IDs, at operation 670, i is increased by one and j is returned to zero and the process returns to operation 620 to generate a message of the next set of connection IDs for the slots. If a message has been generated for each of the connection IDs, or in other words, if i does equal $i_{max}$ then the process proceeds to operation 680 where both i and j are reset to zero and the process returns to operation 620 to again generate a message.

As can be seen in FIG. 6, messages may be continuously or repeatedly sent by incrementally cycling through the slots by using the slot counter j and can increment the connection ID value i for each cycle of messages for slot counter j.

FIG. 7 illustrates an alternative set of operations in accordance with some embodiments of the present disclosure. For example, FIG. 7 may illustrate an embodiment in which the operation only cycles through the provisioned connection IDs, rather than all of the connection IDs. At operation 710, $i_j$ may be initialized to zero for each possible value of j, with j corresponding to a given slot. The variable may correspond to the number of connection IDs provisioned for a given slot. For example, different protected resources or tributary slots corresponding to j may have different numbers of connection IDs initially provisioned, and each value of j may have a corresponding variable $i_{prov-j}$.

At operation 720, a message is generated with a request region, a connection ID region with connection ID $i_j$, slot counter region with slot counter j, and status region conveying the status of connection ID $i_j$ of slot j. Operation 730 may include transmitting that message.

Operation 740 may include determining whether j equals $j_{max}$. If not, at operation 750 j is increased by a value of one and the process returns to operation 720. If so, at operation 760 the variable j is returned to zero and the operation proceeds to operation 720 so a new message may be generated.

Operation 770 may include determining whether $i_j$ equals $i_{prov-j}$. In other words, whether the value of $i_j$ for the given slot j has generated a message for each of the initially provisioned connection IDs. If not, at operation 780, $i_j$ is increased by one and the process returns to operation 720 to generate another message. If so, at operation 790, the variable $i_j$ is reset to zero and the process may return to operation 720 so that a new message may be generated.

As can be seen, in this way, only the initially provisioned connection IDs may be cycled through. In some embodiments operations 740 and 770 may be performed simultaneously, or one after the other, or in any order or combination thereof.

As will be appreciated, these are merely examples of operations that may be performed, and variations are within the scope of the present disclosure. For example, rather than the embodiment shown in FIG. 7, the operations shown in FIG. 6 may include an additional inquiry associated with operation 660 to determine whether a give value of i has been provisioned. If not, the value of i may be increased until an initially provisioned connection ID is reached.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions. For example, a line card of a node may receive a status message and a processor of the node may process and read the message. The processor may then generate and transmit the message via a line card.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of a processor, one or more portions of a memory, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method to be performed by an electronic device in an optical network, comprising:
    generating a message associated with a slot and at least one connection identification (ID) corresponding to the slot, the message comprising:
    a slot counter region configured to identify the slot;
    a request region configured to activate a protection path utilizing the slot;
    a connection ID counter region configured to identify the at least one connection ID; and
    a status region configured to convey status of the at least one connection ID corresponding to the slot; and
    transmitting the message to other electronic devices in the optical network; and
    wherein the slot counter region repeatedly cycles through slots that are initially provisioned for protection paths and the connection ID counter region repeatedly cycles through connection IDs that are initially provisioned as the message is repeatedly generated and transmitted.

2. The method of claim 1, wherein the status region is configured to convey at least one of (a) good and available, (b) good and path activated, (c) in-use with a given priority, (d) failed resource, and (e) not in use or misconfigured.

3. The method of claim 2, wherein the given priority indicates the importance of communication corresponding to the at least one connection ID relative to other communications corresponding to other connection IDs.

4. The method of claim 1, wherein the status region is binary, indicating one of available and not available.

5. The method of claim 4, wherein the status region includes status for more than one of the at least one connection IDs corresponding to the slot.

6. The method of claim 5, wherein the connection ID counter region identifies connection IDs for at least two connection IDs corresponding to the first slot.

7. The method of claim 2, further comprising sending an activation message based at least on the status region.

8. The method of claim 7, wherein the activation message corresponds to a first communication with a first priority and activates an in-use protection path to displace a second communication using the in-use communication path, the second communication having a second priority lower than the first priority.

9. The method of claim 1, wherein the message is transmitted both upstream and downstream from the electronic device.

10. The method of claim 1, wherein the slot counter region repeatedly cycles through all available slots and the connection ID counter region repeatedly cycles through all available connection IDs as the message is repeatedly generated and transmitted.

11. The method of claim 1, wherein the slot counter region repeatedly cycles through all available slots as the message is repeatedly generated and transmitted.

12. The method of claim 1, wherein the connection ID counter region repeatedly cycles through all available connection IDs as the message is repeatedly generated and transmitted.

13. A non-transitory computer readable medium containing instructions, that when executed by a processor, are configured to:
    generate a message associated with a slot and at least one connection identification (ID) corresponding to the slot, the message comprising:
    a slot counter region configured to identify the slot;
    a request region configured to activate a protection path utilizing the slot;
    a connection ID counter region configured to identify the at least one connection ID; and
    a status region configured to convey status of the at least one connection ID corresponding to the slot; and
    transmit the message to other electronic devices in the optical network;
    wherein the slot counter region repeatedly cycles through slots that are initially provisioned for protection paths and the connection ID counter region repeatedly cycles through connection IDs that are initially provisioned as the message is repeatedly generated and transmitted.

14. The non-transitory computer readable medium of claim 13, wherein the status region is configured to convey at least one of (a) good and available, (b) good and path activated, (c) in-use with a given priority, (d) failed resource, and (e) not in use or misconfigured.

15. The non-transitory computer readable medium of claim 14, wherein the given priority indicates the importance of communication corresponding to the at least one connection ID relative to other communications corresponding to other connection IDs.

16. The non-transitory computer readable medium of claim 13, wherein the status region is binary, indicating one of available and not available.

17. The non-transitory computer readable medium of claim 16, wherein the status region includes status for more than one of the at least one connection IDs corresponding to the first slot.

18. The non-transitory computer readable medium of claim 17, wherein the connection ID counter region identifies connection IDs for at least two connection IDs corresponding to the first slot.

19. The non-transitory computer readable medium of claim 14, further comprising sending an activation message based at least on the status region.

20. The non-transitory computer readable medium of claim 19, wherein the activation message corresponds to a first communication with a first priority and activates an in-use protection path to displace a second communication using the in-use communication path, the second communication having a second priority lower than the first priority.

21. The non-transitory computer readable medium of claim 13, wherein the message is transmitted both upstream and downstream from the electronic device.

22. The non-transitory computer readable medium of claim 13, wherein the slot counter region repeatedly cycles through all available slots and the connection ID counter region repeatedly cycles through all available connection IDs as the message is repeatedly generated and transmitted.

23. The non-transitory computer readable medium of claim 13, wherein the slot counter region repeatedly cycles through all available slots as the message is repeatedly generated and transmitted.

24. The non-transitory computer readable medium of claim 13, wherein the connection ID counter region repeatedly cycles through all available connection IDs as the message is repeatedly generated and transmitted.

25. A system, comprising:
a processor; and
a non-transitory computer readable medium containing instructions, that when executed by the processor, are configured to:
generate a message associated with a slot and at least one connection identification (ID) corresponding to the slot, the message comprising:
a slot counter region configured to identify the slot;
a request region configured to activate a protection path utilizing the slot;
a connection ID counter region configured to identify the at least one connection ID; and
a status region configured to convey status of the at least one connection ID corresponding to the slot; and
transmit the message to other electronic devices in the optical network;
wherein the slot counter region repeatedly cycles through slots that are initially provisioned for protection paths and the connection ID counter region repeatedly cycles through connection IDs that are initially provisioned as the message is repeatedly generated and transmitted.

26. The system of claim 25, wherein in the status region is configured to convey at least one of (a) good and available, (b) good and path activated, (c) in-use with a given priority, (d) failed resource, and (e) not in use or misconfigured.

27. The system of claim 26, wherein the given priority indicates the importance of communication corresponding to the at least one connection ID relative to other communications corresponding to other connection IDs.

28. The system of claim 25, wherein the status region is binary, indicating one of available and not available.

29. The system of claim 28, wherein the status region includes status for more than one of the at least one connection IDs corresponding to the first slot.

30. The system of claim 29, wherein the connection ID counter region identifies connection IDs for at least two connection IDs corresponding to the first slot.

31. The system of claim 26, further comprising sending an activation message based at least on the status region.

32. The system of claim 31, wherein the activation message corresponds to a first communication with a first priority and activates an in-use protection path to displace a second communication using the in-use communication path, the second communication having a second priority lower than the first priority.

33. The system of claim 25, wherein the message is transmitted both upstream and downstream from the electronic device.

34. The system of claim 25, wherein the slot counter region repeatedly cycles through all available slots and the connection ID counter region repeatedly cycles through all available connection IDs as the message is repeatedly generated and transmitted.

35. The system of claim 25, wherein the slot counter region repeatedly cycles through all available slots as the message is repeatedly generated and transmitted.

36. The system of claim 25, wherein the connection ID counter region repeatedly cycles through all available connection IDs as the message is repeatedly generated and transmitted.

* * * * *